(12) United States Patent
Das et al.

(10) Patent No.: US 12,425,409 B2
(45) Date of Patent: Sep. 23, 2025

(54) TRUST-BASED DYNAMIC ACCESS CONTROL SYSTEM

(71) Applicant: Amazon Technologies, Inc., Seattle, WA (US)

(72) Inventors: Shovan Kumar Das, Medina, WA (US); Jessica Kira Szmajda, Washington, DC (US); Bashuman Deb, Aldie, VA (US); Sujan Bolisetti, Bothell, WA (US); Shridhar Kulkarni, Seattle, WA (US); Baihu Qian, Chicago, IL (US); Brandon Michael LaRue, Herndon, CA (US); Stephen A. Saville, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 253 days.

(21) Appl. No.: 18/058,168

(22) Filed: Nov. 22, 2022

(65) Prior Publication Data
US 2024/0171583 A1      May 23, 2024

(51) Int. Cl.
*H04L 9/40* (2022.01)
(52) U.S. Cl.
CPC ........ *H04L 63/102* (2013.01); *H04L 63/0236* (2013.01); *H04L 63/101* (2013.01)
(58) Field of Classification Search
CPC . H04L 63/102; H04L 63/0236; H04L 63/101; H04L 63/105; H04L 63/20
See application file for complete search history.

(56) References Cited

U.S. PATENT DOCUMENTS

| | | | | |
|---|---|---|---|---|
| 6,668,322 | B1 * | 12/2003 | Wood | G06F 21/41 713/182 |
| 6,691,232 | B1 * | 2/2004 | Wood | H04L 63/0815 726/6 |
| 8,812,374 | B1 * | 8/2014 | Sriram | H04N 21/2542 705/26.1 |
| 8,904,506 | B1 * | 12/2014 | Canavor | H04L 67/52 713/182 |
| 9,313,100 | B1 * | 4/2016 | Jenkins | H04L 41/0895 |
| 9,384,074 | B1 * | 7/2016 | Peterson | G06F 9/547 |
| 9,531,719 | B1 * | 12/2016 | Sutton | H04L 63/083 |
| 9,778,952 | B1 * | 10/2017 | Sutton | G06F 9/541 |
| 9,843,576 | B1 * | 12/2017 | Peng | H04L 9/3234 |
| 10,033,719 | B1 * | 7/2018 | Baranowski | H04L 63/123 |

(Continued)

OTHER PUBLICATIONS

NPL Search History (Year: 2024).*
(Continued)

*Primary Examiner* — John B King
(74) *Attorney, Agent, or Firm* — Knobbe, Martens, Olson & Bear, LLP

(57) ABSTRACT

Systems and methods are provided for creating and running an instance of a dynamic access control system (DACS). Trust providers may be defined in a trust broker of the DACS such that trust information associated with the trust providers can be used to create a custom data structure. Resources and resource groups may be defined in the DACS. Policies may be configured or coded in the DACS to map the custom data structure to recourses or resources groups. Additionally, policies may be configured or coded in the DACS to route the data structure and request to network segments or shared with other parties.

20 Claims, 10 Drawing Sheets

(56) References Cited

U.S. PATENT DOCUMENTS

| | | | |
|---|---|---|---|
| 10,115,141 B1* | 10/2018 | Warman | H04L 63/0281 |
| 10,140,466 B1* | 11/2018 | Brisebois | G06F 21/6218 |
| 10,148,495 B1* | 12/2018 | Oczkowski | H04W 8/20 |
| 10,257,184 B1* | 4/2019 | Mehta | H04L 67/306 |
| 10,263,995 B1* | 4/2019 | Kruse | H04L 63/102 |
| 10,432,605 B1* | 10/2019 | Lester | H04L 63/08 |
| 10,454,975 B1* | 10/2019 | Sharifi Mehr | H04L 63/20 |
| 10,592,068 B1* | 3/2020 | Sedky | G06F 9/50 |
| 10,673,971 B1* | 6/2020 | Hindanov | H04L 67/60 |
| 10,708,269 B1* | 7/2020 | Yancey | G06F 21/604 |
| 10,747,390 B1* | 8/2020 | Ranabahu | G06F 21/62 |
| 10,778,664 B1* | 9/2020 | Sullivan | H04L 63/08 |
| 10,778,691 B1* | 9/2020 | Kissell | H04L 63/104 |
| 10,812,482 B1* | 10/2020 | Xu | G06F 21/604 |
| 10,834,167 B1* | 11/2020 | Allen | H04L 67/34 |
| 10,884,587 B1* | 1/2021 | Mohabbati | G06F 16/9538 |
| 10,929,829 B1* | 2/2021 | Hazelwood | H04N 7/183 |
| 10,972,580 B1* | 4/2021 | Dorn | H04L 41/0246 |
| 11,107,128 B1* | 8/2021 | Hazlewood | G06Q 30/0268 |
| 11,134,117 B1* | 9/2021 | Farhangi | G06F 16/95 |
| 11,146,379 B1* | 10/2021 | Ackley-Smith | H04L 9/0825 |
| 11,818,157 B2 | 11/2023 | Maor et al. | |
| 12,141,833 B2* | 11/2024 | Weinberg | G06F 16/9535 |
| 2002/0016777 A1* | 2/2002 | Seamons | H04L 63/0823 705/76 |
| 2002/0161766 A1* | 10/2002 | Lawson | H04L 63/102 707/999.009 |
| 2004/0210771 A1* | 10/2004 | Wood | G06F 21/6209 726/8 |
| 2005/0078705 A1* | 4/2005 | Ito | H04L 67/02 370/466 |
| 2005/0097504 A1* | 5/2005 | Ballinger | G06F 9/4493 717/100 |
| 2006/0031925 A1* | 2/2006 | Natarajan | H04L 69/167 726/3 |
| 2006/0129817 A1* | 6/2006 | Borneman | H04L 67/53 713/170 |
| 2008/0189360 A1* | 8/2008 | Kiley | H04W 4/02 709/203 |
| 2008/0294667 A1* | 11/2008 | Kopf | H04L 67/56 |
| 2009/0063498 A1* | 3/2009 | Rodriguez | H04L 69/22 |
| 2010/0317319 A1* | 12/2010 | Gorman | H04M 3/42382 455/410 |
| 2011/0179477 A1 | 7/2011 | Starnes et al. | |
| 2011/0296186 A1* | 12/2011 | Wong | H04L 63/0428 713/171 |
| 2013/0133023 A1* | 5/2013 | Burstein | H04L 63/0892 726/1 |
| 2013/0298244 A1 | 11/2013 | Kumar et al. | |
| 2015/0106888 A1* | 4/2015 | Cheng | H04L 63/10 726/5 |
| 2015/0134827 A1* | 5/2015 | Shah | G06F 21/604 709/226 |
| 2015/0135277 A1 | 5/2015 | Vij et al. | |
| 2015/0215380 A1* | 7/2015 | Balacheff | H04L 67/10 709/203 |
| 2015/0222604 A1* | 8/2015 | Ylonen | H04L 9/14 713/171 |
| 2015/0358331 A1* | 12/2015 | Rachalwar | G06F 21/629 726/7 |
| 2017/0230335 A1 | 8/2017 | Walker | |
| 2017/0249315 A1* | 8/2017 | Mawji | G06Q 50/01 |
| 2017/0359351 A1* | 12/2017 | Dintenfass | H04L 63/102 |
| 2018/0048640 A1* | 2/2018 | Johansson | H04L 63/18 |
| 2018/0211059 A1* | 7/2018 | Aunger | H04L 63/166 |
| 2019/0075111 A1* | 3/2019 | Mutha | H04L 67/141 |
| 2019/0089705 A1* | 3/2019 | Chud | H04L 63/102 |
| 2019/0165941 A1 | 5/2019 | Ray et al. | |
| 2019/0261203 A1* | 8/2019 | Raleigh | H04W 48/04 |
| 2020/0042679 A1 | 2/2020 | Fuentes et al. | |
| 2020/0084218 A1* | 3/2020 | Yanagita | H04L 63/102 |
| 2020/0128035 A1* | 4/2020 | Ford | H04L 67/146 |
| 2020/0259831 A1* | 8/2020 | Pampati | H04L 63/0281 |
| 2020/0280592 A1* | 9/2020 | Ithal | H04L 63/12 |
| 2020/0314200 A1* | 10/2020 | Grandjean | H04L 63/1441 |
| 2020/0374268 A1* | 11/2020 | Wyatt | H04L 63/102 |
| 2020/0412720 A1* | 12/2020 | Siefker | H04L 41/0895 |
| 2021/0224367 A1* | 7/2021 | Fleming | G10L 17/12 |
| 2021/0266743 A1* | 8/2021 | Kvochko | H04L 63/102 |
| 2021/0336959 A1* | 10/2021 | Shah | H04L 63/0281 |
| 2021/0350016 A1* | 11/2021 | Borah | H04L 63/0428 |
| 2021/0352097 A1 | 11/2021 | Vlahovic et al. | |
| 2022/0166794 A1* | 5/2022 | Thomas | G06F 21/40 |
| 2022/0210173 A1 | 6/2022 | Katmor et al. | |
| 2022/0247785 A1 | 8/2022 | Ly et al. | |
| 2022/0303278 A1* | 9/2022 | Kirnapure | H04L 63/0236 |
| 2022/0321540 A1* | 10/2022 | Loman | H04L 63/0414 |
| 2022/0377649 A1* | 11/2022 | Choi | H04W 48/12 |
| 2023/0027152 A1* | 1/2023 | Doshi | H04L 41/0672 |
| 2023/0388306 A1 | 11/2023 | Kaji et al. | |
| 2023/0421474 A1* | 12/2023 | Olden | H04L 63/08 |
| 2024/0040383 A1 | 2/2024 | Saini et al. | |
| 2024/0106833 A1 | 3/2024 | Ravichandran et al. | |
| 2024/0171573 A1 | 5/2024 | Bolisetti et al. | |
| 2024/0330235 A1* | 10/2024 | Zhang | H04L 45/586 |

OTHER PUBLICATIONS

International Search Report and Written Opinion received in Application No. PCT/US2023/080128, dated Mar. 12, 2024.

Zhaoyu, A Dynamic Trust Model for Mobile Ad Hoc Networks, University of North Carolina, 2002, pp. 1-6.

* cited by examiner

TRUST-BASED DYNAMIC ACCESS CONTROL SYSTEM

BACKGROUND

Computing devices can utilize communication networks to exchange data. Companies and organizations operate computer networks that interconnect a number of computing devices to support operations or to provide services to third parties. The computing devices can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf of, or for the benefit of, the general public.

The advent of virtualization technologies for commodity hardware has provided benefits with respect to managing large-scale computing resources for many clients with diverse needs, allowing various computing resources to be efficiently and securely shared by multiple clients. For example, virtualization technologies may allow a single physical virtualization host to be shared among multiple users by providing each user with one or more "guest" virtual machines hosted by the single virtualization host.

BRIEF DESCRIPTION OF THE DRAWINGS

Embodiments of various inventive features will now be described with reference to the following drawings. Throughout the drawings, reference numbers may be reused to indicate correspondence between referenced elements. The drawings are provided to illustrate example embodiments described herein and are not intended to limit the scope of the disclosure.

DETAILED DESCRIPTION

Figure 1:
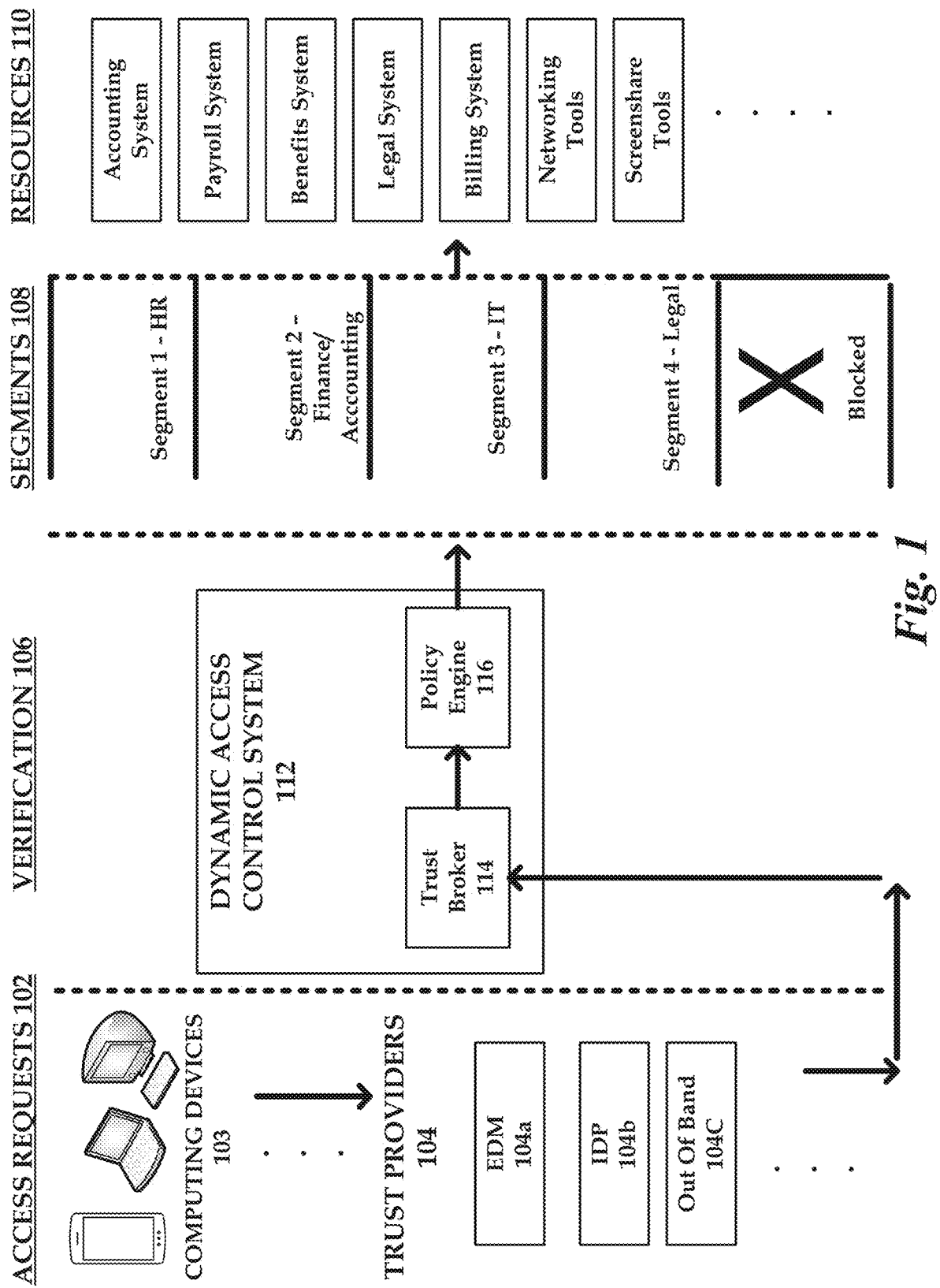
FIG. 1 is a block diagram depicting a high-level technical architecture of a network environment in which a dynamic access control system may be implemented according to some embodiments.

Generally described, the present disclosure relates to a dynamic access control system ("DACS") that provides and manages a "zero trust" security framework in a network environment. The DACS can ensure that users are authenticated, authorized, and continuously validated for access to network segments, network slices, resources on the network (e.g., virtual machine instances, containers, data stores), attachments, applications, and data regardless of whether the users are attempting such access from within or outside the protected network. For example, the DACS may grant a remote computing device access to resources on the network (also referred to generally as "resources") without separate network authentication and authorization (e.g., without use of a virtual private network or "VPN") on a per request basis. This per request resource access may be determined by a custom written policy by a client (public or private) of the DACS and may be based upon information included with the request (e.g., identity and device information), information obtained by the DACS separately from the request (e.g., security and history information obtained asynchronously), or a combination thereof. Beneficially, this enables the client to create—and the DACS to manage—fine-grained network access to specific resources on a per request basis, based on the custom written policy and combination of trust information, without having to grant access to all the applications on the network.

Some conventional networks manage user access to network resources (e.g., applications) through a VPN, which provides broad access to many applications on a network (e.g., a corporate network or university network). However, with access to applications from a variety of locations becoming more prevalent and desirable, a broadly permissive access approach that provides access via a VPN to an entire network comes with increased risk. To address this risk, network administrators typically employ multiple layers of protection that require configuration and coordination across multiple third-party systems such as identity, device management, and networking. Any change in access policies (e.g., new device or user, new updates to security posture) requires network administrators to spend considerable time and effort (e.g., sometimes on the order of weeks or months) updating and verifying security configurations. Moreover, this type of network management becomes increasingly complex as user bases (e.g., enterprise workforces) become larger and more distributed. In addition, traditional VPNs were not designed for a large distributed remote user base, leading to poor user experience (e.g., intermittent connections) in these scenarios. To address these issues, some solutions provide zero trust access to resources. These solutions may determine a risk score for a requestor of a resource. The score would then be evaluated to determine whether a requestor would be granted access to the resource. However, the manner in which the risk score is determined and the information on which the score is based are not typically shared with clients, nor is there an option to share such determination. Thus, the risk score is effectively generated by a "black box." Additionally, clients typically do not have the ability to inject their own security data into the authentication and authorization process or modify how the black box determines the risk score of a requestor. As such, this results in clients not having full control of managing authorization (e.g., grouping requestors into different access groups) based on clients' custom access policies.

Some aspects of the present disclosure address some or all of the issues noted above, among others, by enabling provision of trust information of various types and from a variety of sources, and by enabling implementation of client-defined access polices based on customer-defined combinations of trust information. A DACS may be configured to receive trust information from multiple trust providers in a trust broker of the DACS. The trust broker may format the trust information into a custom data structure that can be used by clients. Clients themselves may define which trust providers they want to subscribe to, therein receiving trust information via the data structure. In a policy engine of the DACS, clients may define what resources they want requestors to have access to (in some cases including the level of access), and the conditions under which access is granted. For example, by referencing the data structure and the resources defined, clients may then use the policy engine to write a custom access policy (also referred to generally as "policy") defining fine-grained access rules for resources. Additionally, clients may also define routing rules to route requests (or in some cases the data structures, or a byproduct thereof) to different destinations, such as a firewall (e.g., a web application firewall or "WAF"), a router, or even a network segment. The data structure and policies may also be used to convert one form of request or security role to another.

As stated above, the DACS may receive trust information from various trust providers. Trust providers themselves may be directly connected to the DACS, provide trust information in a browser extension, or even be an out-of-band trust provider, among other methods of providing trust information to the DACS. When trust providers are directly connected to the DACS, they may use connections such as an OpenID Connect (OIDC) to provide trust information directly to the DACS. Moreover, the DACS may receive trust information via a custom web browser extension used by trust providers to provide trust information (e.g., decorating an HTTP request with trust information). Instead of or in addition to using a web browser extension to provide trust information, trust providers may provide trust information out of band. As used herein, the phrase "out of band" means that trust providers may asynchronously send trust information to the DACS independent of any network request received by the DACS. In some embodiments, trust providers may provide trust information to the DACS according to a predetermined or dynamically determined schedule, in response to a request from the DACS, or in an ad-hoc manner. The DACS can match, during processing of a real time request for access to a resource, the out-of-band trust information to a requestor from which the request originated, and then use the out-of-band trust information in generating the trust information data structure. An example out-of-band trust provider may utilize OpenID Continuous Access Evaluation Profile (CAEP).

Additional aspects of the present disclosure relate to utilizing the trust information in order to build a custom trust information data structure that can be evaluated using customer policies or provided to downstream recipients. The trust information may identify in real time, or near real time, the particular requestor who is trying to obtain access to a resource via an identity provider (IdP). In some embodiments, the trust information may identify or include information about a device the requestor is using to gain access to the resource (e.g., device information obtained via electronic device management (EDM) providers). The trust information may also be information stored in a data store that is retrieved when an access request for a resource is made. The data structure may be built for every resource request utilizing trust information at the time of the request. Therefore, the data structure can provide trust information in real time, or near real time.

Further aspects of the present disclosure relate to allowing clients to write custom policies based on trust information within the data structures. These custom policies may be configured through user interface (UI) pages or via programmatic coding. Custom polices allow the DACS to analyze the trust information and then map the trust information to a resource or resource grouping. The DACS can also utilize the trust information and route the requestor to one or more network segments. Moreover, DACS may utilize the trust information and convert the requestor from one security role to another.

Various aspects of the disclosure will now be described with regard to certain examples and embodiments, which are intended to illustrate but not limit the disclosure. Although aspects of some embodiments described in the disclosure will focus, for the purpose of illustration, on particular examples of defining trust providers in the DACS, defining resources and recourse groups in the DACS, and defining policies in the DACS, the examples are illustrative only and are not intended to be limiting. Any feature used in any embodiment described herein may be used in any combination with any other feature, without limitation.

Overview of Example Computer Environment

With reference to an illustrative embodiment, FIG. 1 shows an example network environment in which features of the present disclosure may be implemented.

In some embodiments, the network environment may be or include a virtual private cloud-based wide area network (also referred to as a "VPC-WAN" for brevity) configured within a cloud-based network provider's shared network infrastructure (also referred as a "cloud provider network"). The VPC-WAN may be considered "private" in the sense that it is separated from any other traffic and/or clients (including but not limited to other VPC-WANs) sharing the same cloud provider network. Thus, the VPC-WAN may also be referred to more generally as a "private wide area network," or as an example of a "private network." The VPC-WAN may be considered "virtual" and "cloud-based" in the sense that it is implemented on top of the cloud-based network provider's shared network infrastructure rather than being implemented on separate infrastructure of a client.

In some embodiments, the network environment may be or include other types of private networks, such as a local area network ("LAN") or wide area network ("WAN") operated by or for a particular entity outside the infrastructure of a cloud provider network. For example, LAN or WAN infrastructure may be operated as a single-client private network in which a DACS may implement trust-information-based access policies of a single client.

In some embodiment, the network environment may be or include a global network. More specifically, a DACS may be attached to a global network or portion thereof. In some implementations, a global network may be (or include) a telecommunications network, for example a public or private cellular network (e.g., 4G/LTE, 5G/NR, 6G, etc.) run at least partly using infrastructure of a cloud provider. In some embodiments, a global network may be single, private network that acts as the high-level container for network objects. Such a global network may be referred to as a VPC-WAN or "cloud WAN." A global network can contain both transit gateways and other core networks. These can be managed in a network manager console. A core network may be a global network managed by a web services provider. This includes regional connection points and attachments, such as VPNs, VPCs, and transit gateway connects. Core networks may operate in regions that are defined in a core network policy document.

A core network edge may be associated with a regional connection point managed by a web services provider in multiple regions, as may be defined in a core network policy. Every attachment may connect to a core network edge. Illustratively, this may be a web services provider's transit gateway, and it inherits many of the same properties. In a core network policy document, a region may be defined where users want connectivity. At any time, regions may be added, deleted, or modified using the policy document. For each region that is defined in a policy document, a cloud WAN may create a core network edge router in a specified region. All core network edges in a core network may create full-mesh peering with each other to form a highly resilient network. Traffic across a web services provider's global network uses redundant connections and multiple paths.

Segment actions may define how routing works between segments. After creating a segment, users may choose to map attachments to the segments either by explicitly mapping a resource to a segment (for example, "VpcId:" vpc-2f09a348) or by creating and using attachment policies. Instead of manually associating a segment to each attachment, attachments are tagged. Those tags may then be associated with the applicable segment. When attachments are mapped to segments, users may choose how routes are shared between segments. For example, users might want to share access to a VPN across multiple segments, or allow access between two types of branch offices. Users may also choose to configure centralized internet routing for a segment, or route traffic between segments through a firewall. The techniques disclosed herein in the context of network segments may also be applied to network slices on a cellular network.

When creating a core network within a global network, a user may create the core network automatically to become the owner of the core network. A core network owner may have full control and visibility over all parts of a cloud WAN network. The core network owner may then share a core network across accounts or across an organization using a resource access manager. The account to which the core network is shared becomes may become an attachment owner. An attachment owner may have permission only to create connections, attachments, or tags, but may not have permission for any core network tasks. A core network owner can also be an attachment owner.

An attachment owner may create, update, or delete VPC attachments. An attachment owner may add, update, or remove attachment tags. Peering may allow interconnecting between a core network edge and transit gateway in the same region using a peering connection. Users may create one or more route table attachments over a peering connection to peer a transit gateway route table through a cloud WAN network segment, allowing users to deploy end-to-end network segmentation across a transit gateway and cloud WAN-based networks.

A home region may be the region where data related to use of a cloud WAN core network is aggregated and stored. A cloud WAN may aggregate and store this information in a home region to provide users with a central dashboard with visualized insights into a global network. A web services provider may aggregate and store this regional usage data from the regions that are being used in different physical locations. This data may include but is not limited to:
 topology data for registered transit gateways
 event data for transit gateways and VPNs
 transit gateway IDs for registering transit gateways into a global network
 location data related to device and site registrations
 provider and link data related to link registrations
 IP address and CIDR ranges used in cloud WAN and transit gateway connect peers Furthermore, all movement and data aggregation may occur over a secure and encrypted channel and stored with encryption at rest. This may be done via a third-party to create maps of a global network. Resource identifiers collected during device and site registrations to generate those maps may be sent to various parties.

As related to the concepts herein, cloud provider networks often provide access to computing resources via a defined set of regions, availability zones, and/or other defined physical locations where a cloud provider network clusters data centers. In many cases, each region represents a geographic area (e.g., a U.S. East region, a U.S. West region, an Asia Pacific region, and the like) that is physically separate from other regions, where each region can include two or more availability zones connected to one another via a private high-speed network (e.g., a fiber communication connection). An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time.

Furthermore, and also related to the concepts herein, regions of a cloud provider network are connected to a global "backbone" network which includes private networking infrastructure (e.g., fiber connections controlled by the cloud provider) connecting each region to at least one other region. This infrastructure design enables users of a cloud provider network to design their applications to run in multiple physical availability zones and/or multiple regions to achieve greater fault-tolerance and availability. For example, because the various regions and physical availability zones of a cloud provider network are connected to each other with fast, low-latency networking, users can architect applications that automatically failover between regions and physical availability zones with minimal or no interruption to users of the applications should an outage or impairment occur in any particular region.

Moreover, and also related to the concepts herein, the cloud provider network can also include a number of edge locations positioned close to customer workloads, for example close enough to satisfy workload latency requirements or data sovereignty requirements. An edge location can be an extension of the cloud provider network outside of the traditional region/AZ context. For example, an edge location can be a data center positioned to provide capacity to a set of customers within a certain latency requirement, a set (e.g., 1 or more) of servers provided to a customer's premises, or a set of servers provided within (or forming part of) a cellular communications network, each of which can be controlled at least in part by the control plane of a nearby AZ or region.

The network environment—whether implemented as a VPC-WAN, a single-client private network, or in some other manner—may include various network resources for which users may request access or with which users may otherwise interact from inside or outside of the network. For example, the network environment may include applications, network segments, network slices, network attachments, and the like. A DACS may be implemented to enable and manage trust-information-based access policies for any network resource associated with the network, or only a subset thereof.

As shown in FIG. 1, a computing environment may include access requests 102, computing devices 103, trust providers 104, verification 106, DACS 112 which includes at least trust broker 114 and policy engine 116, example segments 108, and resources 110.

As shown in access request 102, a user of a computing devices 103 may seek to access resources, such as resources 110, over a computer network. The computing devices 103 shown may have hardware and/or software installed that can directly communicate trust information via the trust providers 104 to the DACS. For example, the computing devices 103 may have an agent installed on them, such agent may be associated with trust providers such as an enterprise device management solution (EDM) 104a or identity provider (IdP) 104b solution, where these solutions can evaluate trust information about the computing devices and a user (e.g., requestor) of the computing devices 103, respectively. For example, an EDM solution may provide device information such as current operating system, type of antivirus software installed, type of malware defense installed, type of disk encryption installed, manufacturer of the device, model of the device, current location of the device, type and model of hardware associated with the device, whether the device meets a National Institute of Standards and Technology (NIST) standard, firmware updates, applications installed, or an EDM risk score of the device, among other device information. As another example, an IdP solution in communication with the DACS may provide information regarding a user of a device such as name of the user, username, roles assigned to the user, an email associated with the user, verified locations of the user (e.g., video evidence, government appearances such as court cases, government documents such as police reports, public and social media content confirming location, etc.), and an IdP risk score related to the user, among other user information. The DACS may be directly connected to trust providers and provided trust information via authentication protocols such as, but not limited to, Security Access Markup Language (SAML) and OpenID Connect (OIDC).

As stated above, trust information can also be communicated to the DACS via a web browser extension when a requestor is seeking access to a web application. The web browser extension may decorate a request, such as an HTTP request, with trust information such as the trust information described above so that the DACS may receive such trust information. In some embodiments, to decorate an HTTP request with trust information, the web browser extension may include trust information in a header of the HTTP request, such as encrypted trust information included in the form of a JavaScript Object Notation (JSON) Web Token (JWT). For example, an HTTP request may be decorated with trust information giving the current geolocation of a requestor and the requestor's device. The DACS may then receive this HTTP request and know to seek out trust information in the HTTP request header.

Moreover, trust information may be provided to the DACS via out-of-band providers. Out-of-band trust providers are trust information providers that do not communicate trust information via an HTTP request web extension, nor do they provide trust information in connection with specific requests. Out-of-band trust providers may communicate with the DACS via variety of methods not covered via HTTP request decoration, for example, via a Continuous Access Evaluation Protocol (CAEP) or even through ad-hoc file requests where trust information files are sent securely. As another example, vulnerabilities may be discovered in an application running on a requestor device where both directly connected trust providers and HTTP web extension trust providers are not informed on, however, an out-of-band trust provider may be informed that an application running on the requestor's device has a vulnerability and inform the DACS. As such, the out-of-band trust provider may be able to provide the DACS with supplemental trust information that is not offered via the HTTP web extension trust providers or the directly connected trust providers. Out-of-band trust providers may also be able to offer history information concerning the device of a requestor (e.g., location history, IP address history, etc.) or history information concerning the requestor, among other types of trust information.

Therefore, the DACS may take trust provider information from the directly connected trust providers, HTTP web extension trust providers, the out-of-band trust providers, any other trust providers, and use that trust information at least upon the initial resource request and create a custom data structure specific to an individual client. In other words, the DACS may receive and process both arbitrary and uniform trust information from a plurality of sources. This offers clients of the DACS the ability to get the trust information they want from whatever source they desire. Trust information from any trusted source allows clients to write fine grained access and/or routing policies in the specific manner they want, which is discussed in more detail below.

The verification 106 section shows that an example DACS 112 may utilize a trust broker 114 and a policy engine 116 to determine access and/or routing based on trust information from trust providers. The trust broker 114 may receive the trust information from any of, but not limited to, the trust providers 104 and then build a custom data structure for a client based on the trust providers to which the client has subscribed. As will be described in more detail below, clients will have the ability, via DACS 112, to code and/or configure trust providers that have the trust information the client is looking for to build access and/or routing policies. The DACS 112 may at least analyze the trust information provided by the trust providers the client subscribed to and at least determine how the data structure with the trust information can be built. For example, the data structure may take into account previously written access/routing policies by the client and elect to include certain trust information or not include other trust information.

Based at least on the trust information within the data structure built by the trust broker 114, the client may then utilize policy engine 116 to configure, code, or write custom access and/or routing policies. As described in more detail below, the client can define resources and resource groups in which to map the trust provider information to. Therefore, in writing a custom access and/or routing policy, via code or configuration, the client may evaluate each resource request by a requestor by looking at the trust information and make decisions. These decisions may be to allow the requestor access to a resource, or group of resources, or the level of access. As an example, a policy may determine via trust information that the requestor is an accountant from the accounting department and only allow read access into a legal docketing software (resource). Also, a policy may be written to analyze the trust information and determine that a requestor is making a request for a resource via a mobile computing device, and therefore, the request needs to be routed through additional web application firewall settings.

Example segments 108 show network segments for HR, finance and accounting, information technology, legal, and blocked (these network segments should not be seen as limiting). As used herein, the term "network segments" (or simply "segments" for brevity) refer to network constructs used to separate network traffic into different logical network portions that share physical network infrastructure. For example, a VPC-WAN may be configured using network policy data that defines various aspects, such as regions encompassed by the VPC-WAN, network segments that may span multiple regions within the VPC-WAN but remain isolated or substantially isolated from each other, the manner in which isolated networks (virtual private clouds or "VPCs," VPNs, software-defined wide area networks or "SD-WANs," direct connections to on-premise client networks, etc.) are to be attached to network segments, and the like. Thus, a VPC-WAN may span multiple regions of the cloud provider network, and may include any number of isolated networks that may be hosted within the cloud provider network's physical data centers (e.g., VPCs) or may be physically external to the cloud provider's data centers (e.g., on-premise client networks or third-party networks communicating with the cloud provider network via VPN, SD-WAN, direct connections, etc.). This allows client traffic originating from one endpoint to be transmitted to another endpoint of the VPC-WAN regardless of whether one or both endpoints are within or external to the cloud provider network's physical data centers. Moreover, a client may segment traffic of a VPC-WAN by defining network segments within the network policy data using one or more rules for attachment of isolated networks to the segments.

To determine the proper segment for network traffic and enforce segmentation polices, segment data may be included in network packet header metadata. At layer 3 of the of the open systems interconnection ("OSI") model, some networks perform routing operations using packet headers that include a 5-tuple of metadata: source address, such as an internet protocol ("IP") address for the sender of the packet; destination address, such as an IP address for the intended destination of the packet; source port, such as the sender's transmission control protocol ("TCP") or user datagram protocol ("UDP") port from which the packet originated; destination port, such a TCP or UDP port of the intended destination of the packet; and protocol to be used. In some embodiments, to facilitate routing of traffic in a given segment across a network or regions thereof while maintaining isolation among different segments, additional metadata may be added to a packet header to indicate the segment of the source of the packet. For example, the layer 3 packet header may be expanded to a 6-tuple of metadata for routing, with the additional metadata item being a segment identifier. The additional metadata item may be added to the header by a gateway or the sender of the packet (e.g., by the host device from which the packet originates, by a virtual machine instance or hypervisor executing on the host device, etc.). A policy may be implemented at the gateway such that when a packet is received, the gateway may evaluate the segment identifier and determine which routing data (e.g., segment-specific route table) to use to route the packet. In this way, a single gateway or system of gateways within a given network or region may be able to resolve the segment to which the packet belongs, and route traffic for multiple segments while also maintaining isolation between the segments by using segment-specific route information.

A client may write an access policy to route a request for a resource to a particular network segment of multiple network segments implemented in the network environment. The particular network segment may be different from a network segment with which the request is originally associated, or the request may not be originally associated with any segment. For example, a policy may be written to analyze the trust information and determine that a requestor is using a bring your own device (BYOD) and route the request to a network segment that is isolated from a network segment with sensitive information. As another example, a policy may be written to analyze the trust information and determine that a requestor has an HR role and therefore should be routed to the HR segment of the network. The blocked network segment shows that a policy may be written to analyze the trust information and determine that a requestor should not be allowed access to any network segment and resource, for example, because the requestor is using a device from a manufacturer that is on a banned list or using a device in a country that the requestor is not allowed to access resources from.

Resources 110 shows example resources that a requestor may be trying to gain access to. Resources 110 are positioned after the example segments 108 because, in some embodiments, requestors may be routed to network segments before being allowed access to a resource. However, that may not always be the case and in certain embodiments, requestors may be routed directly to a resource without any assignment of the request to a particular segment. As shown in resources 110, example resources that a requestor may be trying to gain access to could be an accounting system, a payroll system, a benefits system, a legal system, a billing system, a networking tools system, and a screenshare tool system. A policy may be written to analyze the trust information and determine that a requestor has a role of an accountant and be routed directly to the accounting system resource. Also, a policy may be written to analyze the trust information and determine that a requestor has the role of an attorney and be routed directly to a legal system. Also, a policy may be written to analyze the trust information and determine that a requestor has the role of an information technology professional and is therefore routed to both the networking tools resource and the screenshare tools resource. As stated above, the resources shown in the section of resources 110 are meant only to be an example of resources and not to be limiting.

Trust Broker & Policy Engine

Figure 2:
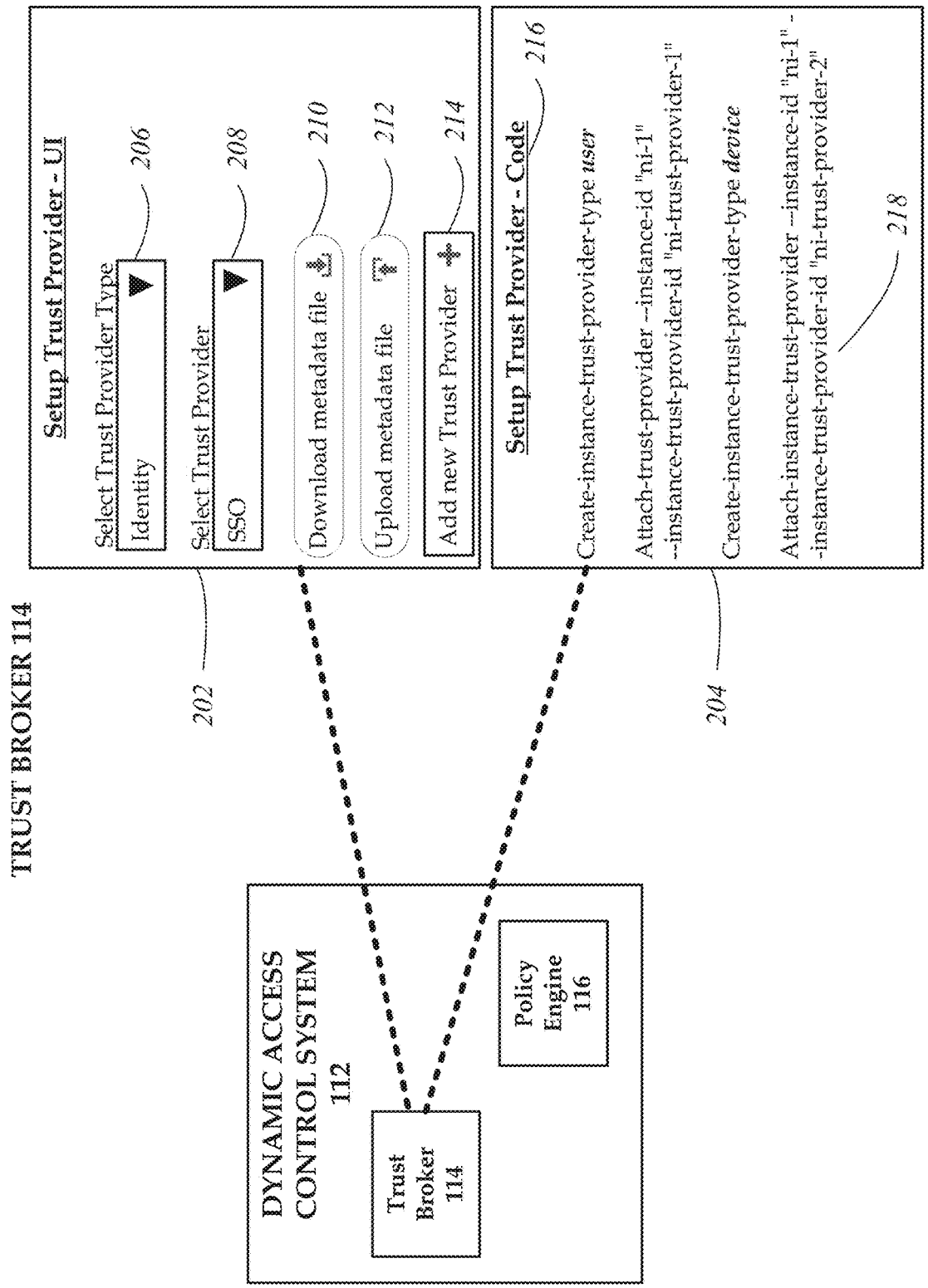
FIG. 2 is a block diagram depicting an example configurable user interface and coding user interface to connect to a trust provider according to some embodiments.

FIG. 2 illustrates a block diagram depicting an example configurable user interface and coding user interface to connect to a trust provider. As shown in FIG. 2, the trust broker 114 may be within the DACS 112 and may allow configuration via UI 202 or coding via UI 204.

As shown in FIG. 2, UI 202 may allow a client to configure what trust providers it wants to subscribe to in order to receive a custom data structure from DACS 112 and write a custom policy. Field 206 shows that DACS 112 may allow a client to select a type of trust provider, here, an identity provider like an IdP. As stated above, IdP trust providers can provide trust information related to a requestor and EDM trust providers can provide trust information related to computing devices associated with a requestor. However, as stated above, DACS 112 is not limited to only EDM and IdP trust providers, any trust providers that can access DACS 112's web extension or even out-of-band trust providers can be selected. Field 208 may allow a client to select from predefined directly connected trust providers, HTTP request web extension enabled trust providers, or any other trust providers that DACS 112 already has access to. In the example shown, a single sign on (SSO) trust provider is selected, however, another type of trust provider may have been selected like a geolocation trust provider that provides real time location services of the requestor's device.

Download metadata file button 210 may allow a client to download metadata related to the currently selected trust provider. Upload metadata file 212 may allow a client to upload metadata associated with trust provider. For example, a client may upload metadata that describes to the DACS 112 how to connect to an out-of-band trust provider in order for the DACS 112 to receive trust information from the out-of-band trust provider. Also, add a new trust provider button 214 may allow a client to add a new trust provider once the client is done configuring attributes about a trust provider.

As an alternative to configuring a new trust provider to be added, UI 204 allows clients to write via detailed coding how to add a specific trust provider such that the trust provider is added to the custom data structure that DACS 112. As shown in UI 204 a client may write code to define the type of provider the customer is adding to its data structure feed, such as a user identifying trust provider like an IdP, a computing device identifying trust provider like an EDM, or an out-of-band trust provider (e.g., one that identifies computing applications which have recently identified vulnerabilities).

By not being restricted to fields, drop downs, and other buttons, clients in UI 204 may perform sophisticated functions in defining a trust provider to include in a data structure feed. For example, clients may write code that informs the DACS 112 what specific trust information to take from a trust provider and what information to exclude from a trust provider. Some clients may want location history of computing devices and others may want history of applications installed on a computing device, among other information requests. As another example, clients may inform the DACS 112 how to communicate and get information from out-of-band trust providers. For example, a client may write code that informs the DACS 112 that the out-of-band trust provider can be communicated via the CAEP protocol and that specific trust information formats that the trust information will be delivered in.

Figure 3:
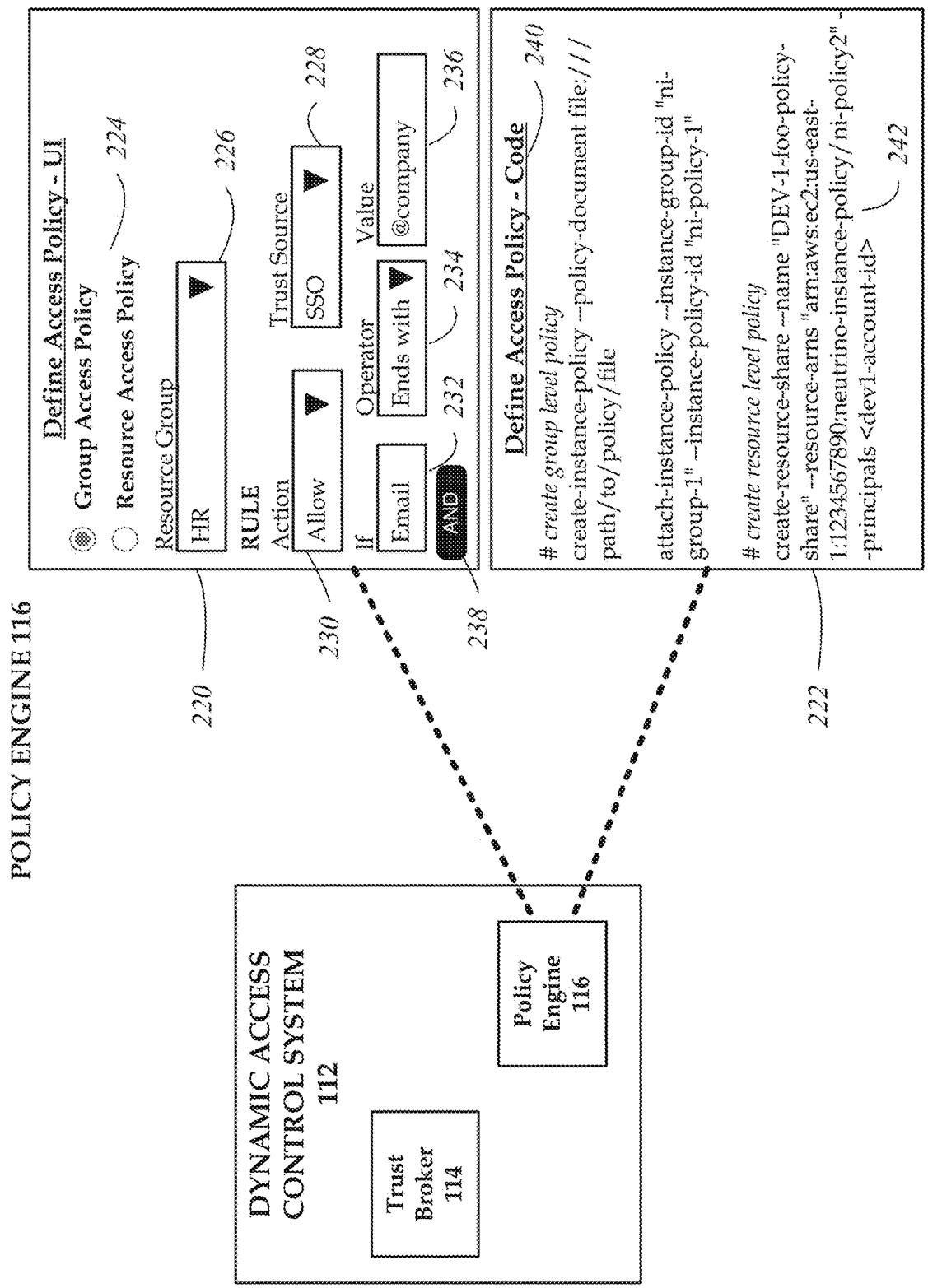
FIG. 3 is a block diagram depicting an example configurable user interface and coding user interface to create a resource access and routing policy according to some embodiments.

FIG. 3 illustrates a block diagram depicting an example configurable user interface and coding user interface to create a resource access and routing policy. As shown in FIG. 3, the policy engine 116 may be within the DACS 112 and may allow configuration via UI 220 or coding via UI 222. As will detailed below, clients may map trust information from a data structure to resources, resource groups, or routing details.

As shown in FIG. 3, UI 220 may allow a client to configure resource or routing policies based on the data structure provided by trust broker 114. A policy may be defined in terms of one or more evaluations to be applied to trust information associated with a request, and corresponding actions to be taken regarding the request based on results of the evaluation(s) of trust information.

As described above, but now shown, clients may first define what resources routing policies may provide access to. Furthermore, resource groups may be defined to group together resources, for example, grouping all IT resources into a resource group named IT group. Radio buttons 224 may allow a client to select whether an access or routing policy is being defined for one resource or a group of resources. If a group access policy is selected, field 226 may allow selection of resource groups as shown (HR group selected here), otherwise, field 226 may allow selection of individual resources (e.g., an individual word processing application). A user may then define one or more evaluations for the policy, and actions to take based on result of the evaluation(s). In some embodiments, an evaluation and corresponding action may be implemented as a rule. For example, in the rule section of UI 220, field 230 may let a client select the action to be taken depending what trust information is provided, for example, a value of allow or deny. Allow in this instance would mean the requestor would gain access to the resource where deny would not allow access to the resource.

Other options which can be selected in field 230 could be read or write access while in a resource, allowance to all or certain sections of a resource, among other selections. Field 228 may allow a client to select which trust provider the action of field 230 applies to. For example, a client may select that the action of field 230 (e.g., allow access) will be applied to an IdP trust provider. Field 232 shows that a client may put a value which is evaluated in a conditional manner, for example, as shown in field 232, an email of a requestor will be evaluated against fields 234 and 236 in order to determine if a request would be allowed to access a resource. Under field 234, an operator may be chosen to evaluate the value in field 232. Example operators may be "end with, "starts with," "contains," "equals," among other operators. Field 236 may allow a client to put in the value that fields 232 and 234 are evaluated against. For example, here, the @company value would mean that a requestor with an email address that ends in @company, such as jwright@company would be allowed, which is determined by the values of fields 228, 230, 232, 234, and 236. Field 238 may allow a client to add more rules and whether the added rules are added by either "and" or "or," where "and" can mean that the additional rule must be satisfied in order for access to a resource where "or" could mean that one of the rules, including the one being currently configured only has to be satisfied before access is allowed.

As an alternative to configuring a custom access or routing policy, UI 222 may allow clients to write via detailed coding a policy based on the data structure provided by DACS 112. As shown in UI 222 a client may write code to define exactly how the data structure provided may determine access or routing. For example, if a data structure has three trust providers trust information within it, one from an IdP, one from an EDM, and one from an out-of-band provider, a client may elect to only use the IdP trust provider to determine whether a requestor can gain access to a resource. In this example, a client may write a policy in code to only evaluate if the requestor has an email address from a certain company before allowing access to an intranet website for the company. As a second example, a client may write code to evaluate both the IdP and EDM trust provider to see if a requestor can again access to a company's legal system. In this second example, a client may write code that checks the IdP trust information to see if the user has the role of an attorney and whether a third-party verification service has not flagged this attorney as a security risk. Also, in this second example, the client may write code to check the EDM trust information to ensure that the computing device used by the requestor is not in a restricted country, has all updated firmware, is not made by a restricted manufacturer, among other things. Therefore, in this second example, only if the IdP and EDM trust information is verified, will the requestor be allowed access to the legal system.

Still referring to UI 222, a client may write code to check the data structure for a risk profile associated with a requestor and may send the requestor to additional security checks (e.g., additional firewall) based on the risk profile. For example, an IdP trust provider or a client-managed trust provider may provide a risk score of the requestor which can be found within the data structure. Also, an EDM trust provider may provide that the requestor is using a mobile computing device which can be found within the data structure. Therefore, a client may write code for a policy that determines that if a requestor has a certain risk score (e.g., moderately risky) and is using a mobile computing device, then to route that requestor to a network segment with additional security settings or even have additional security checks performed (firewalls, verifications, etc.) before the requestor is allowed access to the resource.

It should be noted that both the trust broker 114 and policy engine 116 may be implemented via one or more computing devices, computer servers, computer software, or a combination thereof. Such as those defined in, but not limited to, FIG. 10.

Custom Data Structure

Figure 4:
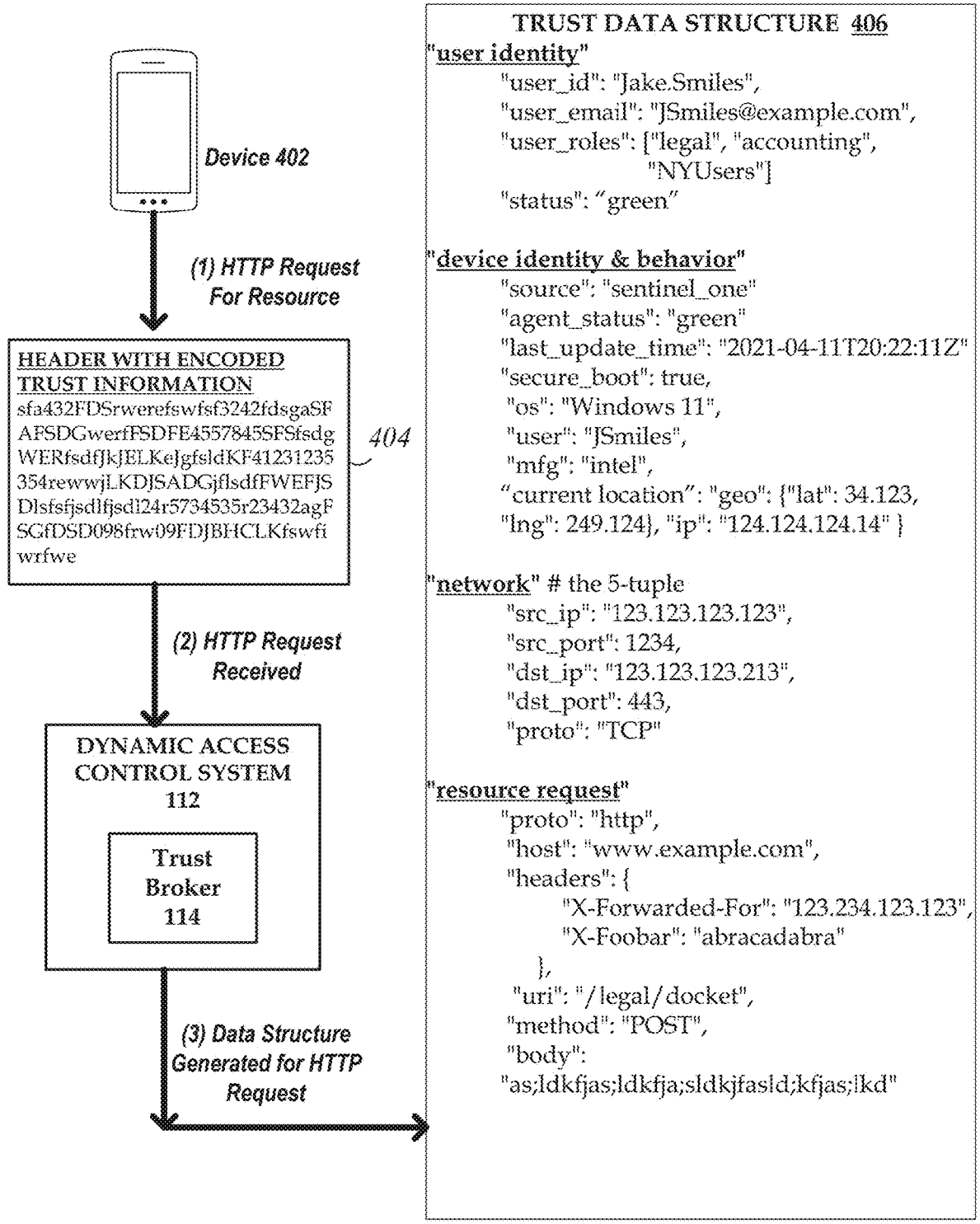
FIG. 4 is a block diagram depicting generation of an example trust information data structure for a Hypertext Transfer Protocol (HTTP) request according to some embodiments.

FIG. 4 is a block diagram depicting an example of generating a trust information data structure for a request. A shown in FIG. 4, at step (1), a requestor via device 402 may generate a resource request, such as request 404, to access or use a resource, such as one of resources 110. As stated above, a requestor may be associated with a client as an employee, for example, as an accountant or lawyer who works for the client. As shown in request 404, the request for a resource may include header data, such as JavaScript Object Notation (JSON) encoded data, that is unreadable by a human. This may be due to an encoding mechanism or due to a certain type of encryption. The contents of request 404 may contain trust information which was provided by trust providers associated with the device 402, such as an IdP, EDM, or out-of-band trust provider.

In some embodiments, trust information may be determined in a dynamic manner in response to—or substantially contemporaneously with—initiation of the request 404 the user device 402. For example, user device 402 may be operated by a user. The user may use a web browser application to generate an HTTP request for access to a particular resource of a client. The web browser application or an executable extension thereof may generate trust information such as user account identity information, information regarding properties of the user device, etc. For example, the user may be required to perform an authentication procedure that provides user account identity information to the web browser application or extension. As another example, the web browser application or extension may obtain data regarding properties of the user device 402, such as device manufacturer, software versions, malware protection, or the like. The trust information may then be included in the HTTP request. For example, the trust information may be encoded using JSON and included in a header of the HTTP request as a JWT.

At step (2), DACS 112 may receive request 404 and process it through trust broker 114. Trust broker 114 may reference the client's configuration or coding which defined trust providers the client subscribed to, as shown in FIG. 2. In referencing such trust provider subscriptions, at step (3) trust broker 114 may build a data structure 406 (also referred to as a trust information data structure) in real time, or near real time, which at least references the client's trust provider subscription details and the contents of request 404. In other words, a custom data structure may be built for the client by trust broker 114 every time a resource request is made by a requestor. The trust broker 114 may also add to the custom data structure additional trust data stored in a data store that may be associated with, but not limited to, at least the request 404, the requestor, the client, or trust providers. This additional trust data may have been obtained by the DACS 112 before or otherwise asynchronously with respect to request 404, such as, from prior resource requests, provided by trust providers, provided by the client, or provided by any other party that may provide information which may be used to build the custom data structure. For example, the request 404 may contain data regarding a user account associated with the name "John Wayne." Trust broker 114 may search a data store and discover that there are history records of resource requests for a person with the same name for resources associated with legal and accounting, even though the current request 404 may not contain a request for a legal or accounting resource. This additional trust data may be also added to the data structure to be analyzed by the policy engine 116.

The data structure 406 may include any number or combination of items of trust information, depending upon the trust provider configuration specified by the client. In some embodiments, the data structure 406 may organize certain items of trust information into groups, subgroups, and so on. The groups/subgroups/etc. may be organized according to type of trust information (e.g., user identity, device properties, etc.), source of trust information (e.g., IdP, EDM, out-of-band provider, etc.), or based on a client's specific configuration. As shown in FIG. 4, data structure 406 may be built by trust broker 114 to contain a section for user identity, device identity and behavior, network, or resource request.

As stated above, trust broker 114 may build data structure 406 in real time, or near real time, during or after receipt of request 404. Therefore, if prior to receipt of the request 404 the client changed trust providers that it subscribes to or what information the client wants from each trust provider, the contents or underlying structure of data structure 406 may change. For example, if prior to request 404 the client modified the definition of an EDM trust provider to now add geolocation information, where it didn't subscribe to such information prior, trust broker 114 may now add geolocation of device 402 to the data structure 406 where prior iterations of data structure 406 did not have geolocation for device 402.

Still discussing data structure 406, the trust information used to populate the sections of user identity, device identity and behavior, network, and resource may have come from multiple trust providers. For example, the user identity section trust information may have come from at least one IdP. The device identity and behavior section trust information may have come from at least one EDM. The network section trust information may have come from a trust provider that provides internet protocol (IP) location information of devices separate from IdPs and EDMs that provided trust information for the other sections described, and the resource request section trust information may have come from an IdP. Therefore, at least due to the configuration or coding by the client from FIG. 2, detailing the trust providers that the client subscribes to, data structure 406 may contain trust information from a plurality of trust providers.

As shown in data structure 406, the user identity section may contain trust information such as user_id, user_email, user_roles, and status. As stated above, this trust information may have been provided by an IdP. User_id may be an identifier in which a resource of the client identifies the requestor as a known user who uses the resource, which may be associated with a requestor's legal name, such as Jake Smiles in the case at hand. The value of User_email may be an email associated with the requestor, for example, JSmiles @example.com, to refer Jake Smiles's email at the entity named company. This email may be referenced against an email that trust broker 114 has stored to ensure against fraud or tampering. User_roles may refer to the employment roles that the requestor is assigned to. As shown in this example, the requestor has the roles of legal, accounting, and NYUsers. Therefore, this requestor may have employment roles within the client's company associated with legal work, accounting work, and also the requestor may be based out of client's New York City office. As such, these roles may dictate which resources the requestor is allowed to access based on the client's written policy, which is described above and below in more detail. Status may refer to an IdP's risk score or rating of the requestor. For example, an IdP may give a risk score or risk category of green to a requestor who is trustworthy, yellow to a requestor who is less trustworthy than green, and red to a requestor who should not be given access to any resource.

As also shown in data structure 406, the device identity and behavior section may contain trust information such as source, agent_status, last_update_time, secure_boot, os, user, mfg, and current_location. As stated above, this trust information may have been provided by an EDM. Source may identify the EDM trust provider, here, the trust provider may have been Sentinel One. Agent_status may identify the risk score assigned to device 402. For example, an EDM may give a risk score or risk category of green to a computing device that is trust worthy, yellow to a computing device that is less trustworthy than green, and red to a computing device that should not be given access to any resource. Last_update_time may indicate the last time device 402 had an operating system or firmware update. Secure_boot may indicate the last time that device 402 was booted up in a secure manner. User may indicate the username of the requestor associated with device 402, or how 402 recognizes the requestor. Mfg may identify the manufacturer of device 402. Lastly, current_location may identify the location of device 402 at the time of request 404. Therefore, the trust information described in this section may also be evaluated by a policy written by the client to determine access or routing.

Other trust information that an EDM may provide to trust broker 114 in order for it to build a data structure may include location history, device level signature history, NIST standards, disk encryption, hardware, and software. Location history may be associated with a history of locations for device 402. Device level signature history may be associated with a history of signatures that device 402 made on a device level. Disk encryption may be associated with information describing what disks of device 402 are encrypted and what type of encryption. NIST standards may be associated with information describing whether device 402 abides by any NIST standards such as NIST 800 standards developed to address and support the security and privacy needs of U.S. Federal Government information and information systems. Hardware may be associated with the computer hardware that is inside or a part of device 402 such as types of processors, memory, buses, drives, I/O devices, and the like. Software may be associated with information describing all the software that is installed or has been installed on device 402.

As additionally shown in data structure 406, the network section may contain trust information such as src_ip, src_port, dst_ip, dst_port, and proto. As stated above, this trust information may have come from a trust provider that provides IP-based location information of devices. This type of trust provider may be separate from IdPs and EDMs that provided trust information for the other sections described. Src_ip may identify device 402's IP address. Src_port may identify a number assigned by a Transmission Control Protocol (TCP) to device 402. Dst_ip may identify the IP address of the resource which the requestor is trying to gain access to. Proto may identify the IP protocol which device 402 is using to communicate, in this case, TCP. This trust information described may also be evaluated by a policy written by the client to determine access or routing.

As also shown in data structure 406, the resource request section may contain trust information such as proto, host, headers, uri, method, and body. As stated above, this trust information may have come from a trust provider that provides resource request information coming from devices such as device 402, which may be an EDM or even a trust provider specializing in providing trust information related to request information and is not an EDM. Proto may identify the protocol associated with the current resource request, here being http. Host may identity the host IP address associated with the resource in which the requestor wants access to, here, www.example.com. Headers may identify the header information associated with the resource request. As stated above, trust information may be decorated in a request header instead of in sections of a trust provider's trust information. For example, the user identity section and the device identity and behavior section may neither identify trust information relating to whether any applications running on device 402 are associated with vulnerabilities. Therefore, the client may elect to get trust information concerning application vulnerabilities from a separate trust provider where the separate trust provider may provide at least a list of computing device applications which have vulnerabilities. Additionally, this trust provider may have the capability to provide trust information in the header of the request instead of in another section in data structure 406. Uri may identify the uniform resource locator identifying a specific section of the host IP address where the resource the requestor is requesting access resides. Method may identify the kind of request that request 404 is, for example, whether it is a POST or GET method. Here, with the POST method, request 404 may indicate to store what is in the body section (as shown below method in data structure 406) and also what is in the header section (as shown above method in data structure 406) for future processing, such as during analysis which policy engine 116 performs when evaluating a policy against a data structure, such as data structure 406.

Policy Access & Routing Examples

Figure 5:
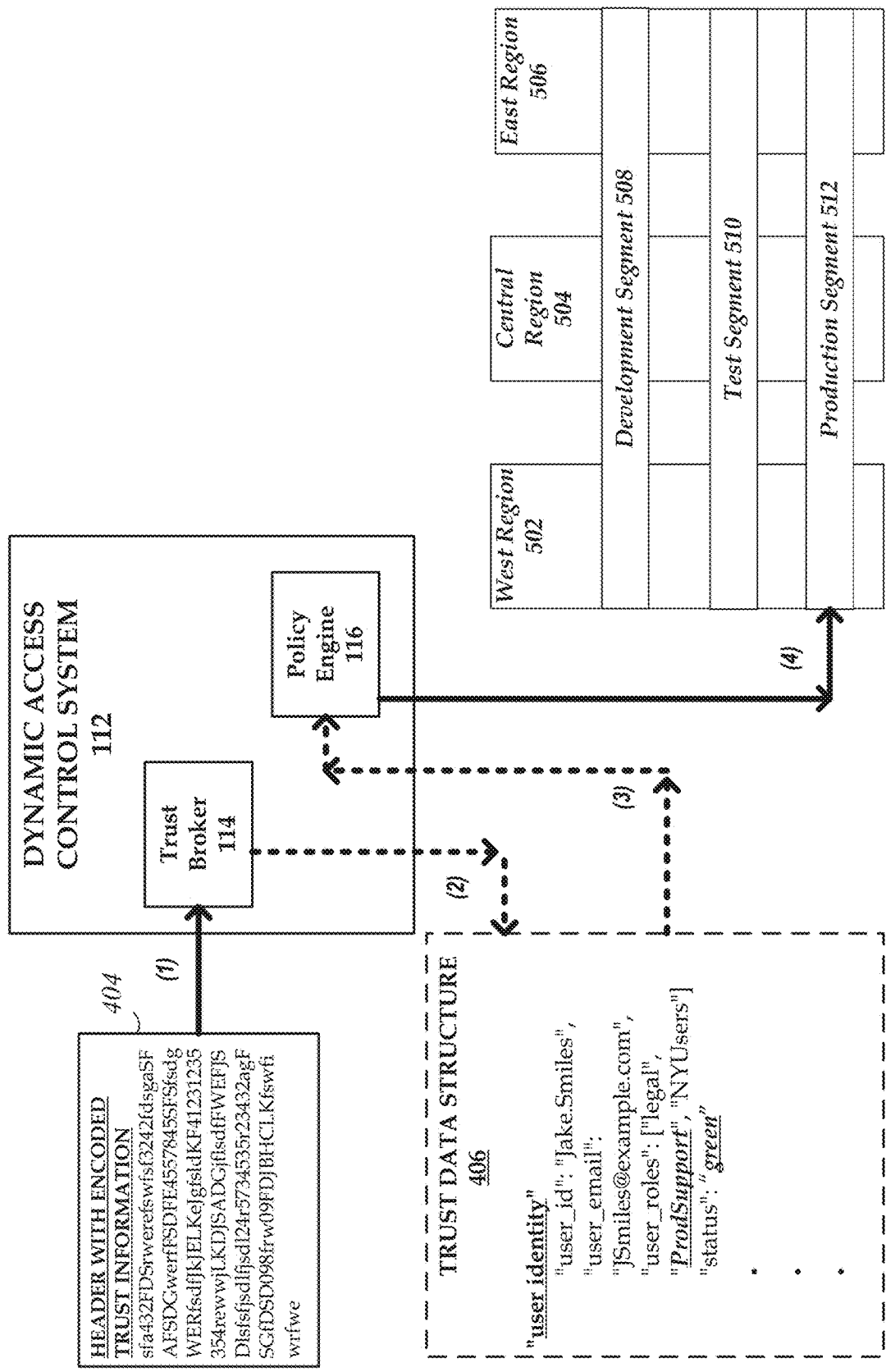
FIG. 5 is a block diagram depicting an example resource request being routed to a network segment according to some embodiments.
Figure 6:
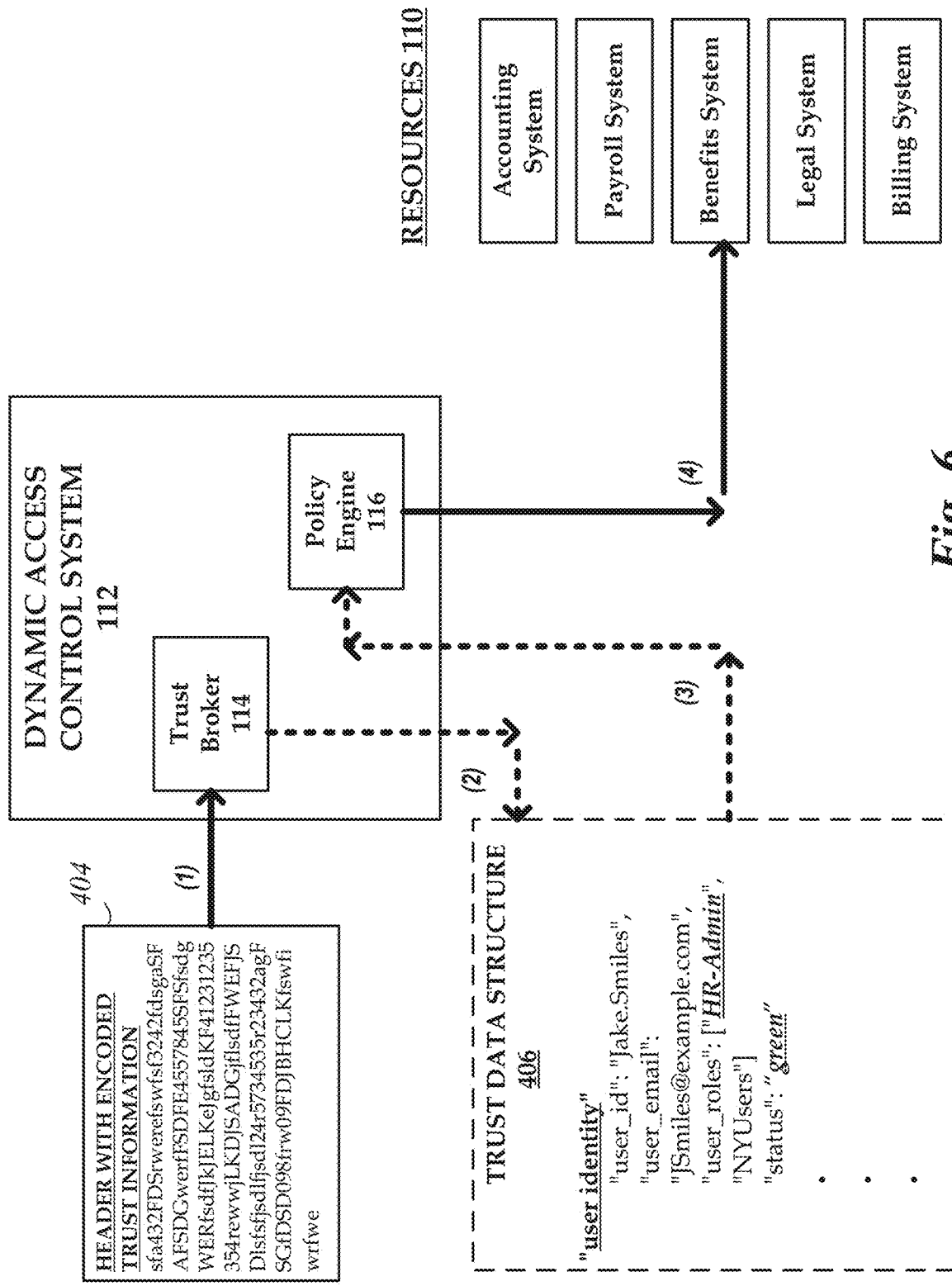
FIG. 6 is a block diagram depicting an example resource request being routed to a specific resource according to some embodiments.
Figure 7:
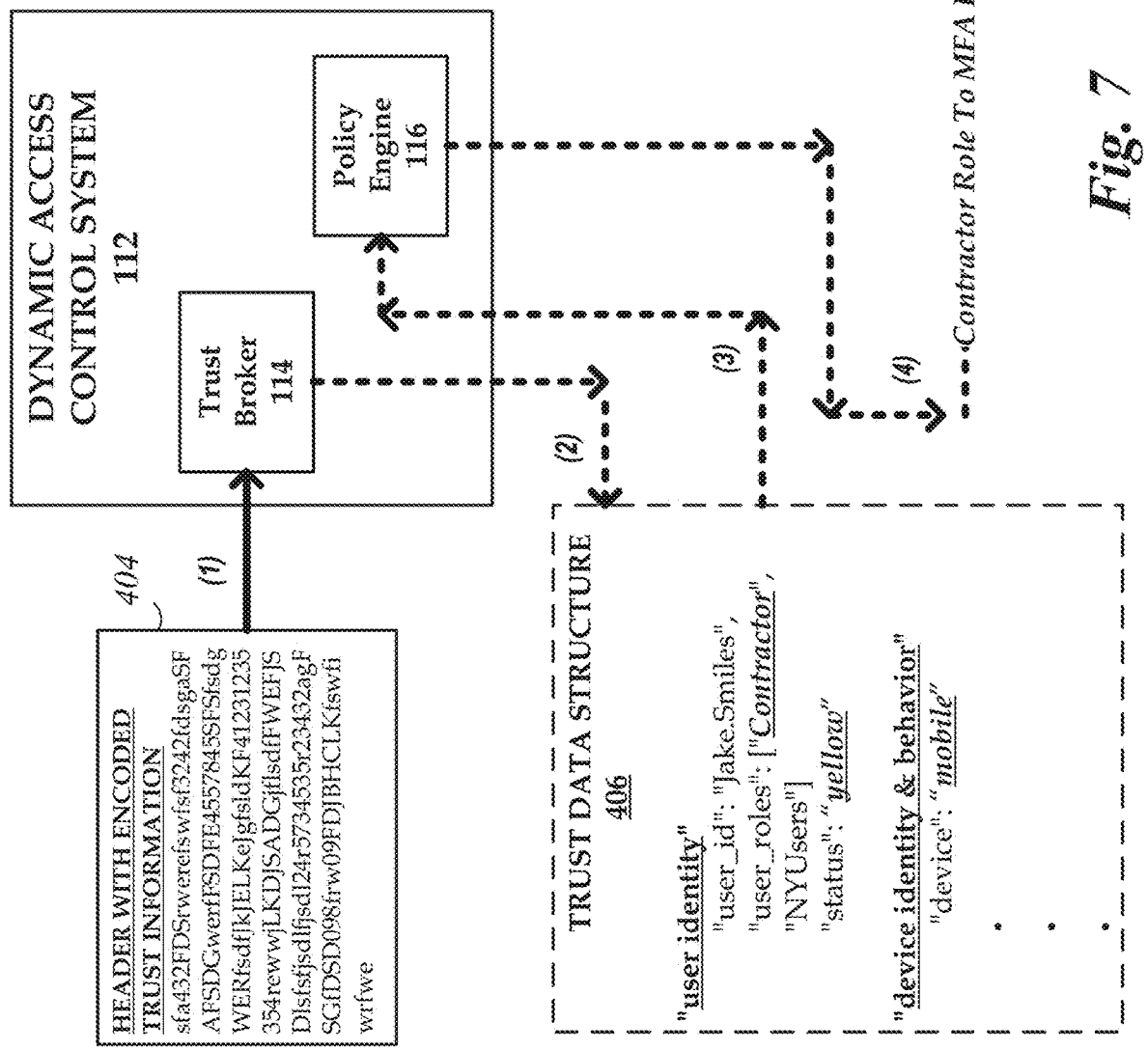
FIG. 7 is a block diagram depicting an example resource request associated with a first role being converted to a second role according to some embodiments.

FIGS. 5-7 are block diagrams depicting application of client-defined access policies to trust information for processing example resource requests by a requestor.

FIG. 5 is block diagram depicting an example resource request being routed to a network segment. As shown in FIG. 5, at step (1), request 404 may be received at DACS 112 by first being processed by trust broker 114. As described above in FIG. 4, trust broker 114 may generate a data structure 406 of trust information for request 404. At step (2) and in the example shown in FIG. 5, such data structure may contain at least a user identity section which has trust information. In this example embodiment, the trust information may indicate via user_roles that the requestor has the roles of legal, ProdSupport, and NYUsers. Moreover, the trust information via status may indicate that the requestor as an individual has a risk score of green.

At step (3), the data structure 406 may be passed to policy engine 116 in order to analyze data structure 406 against policies the client configured or coded, such as shown in FIG. 3. As discussed above, a custom access policy may include one or more evaluations to be applied to trust information, and corresponding actions to be taken based on results of the evaluation(s) of trust information. For example, a policy may map the trust information and resource request to resource(s) or even route the resource request to a network segment, among other actions.

In the illustrated example, the client may have written a policy to route the resource request (and possibly the trust information or information derived therefrom) to a network segment based on the trust information in data structure 406. For example, policy engine 116 may use the written policy to determine that when a requestor has a role of ProdSupport and a status of green, that the requestor should be routed to production segment 512 because production support users should be allowed access to a production database. In the case provided, the written policy may have routed the requestor to a network segment instead of directly to the resource requested because the application requested may store and process confidential information. As such, the client may have a policy of routing any request to a resource that stores or processes confidential information to a network segment because a network segment may have added security procedures as opposed to directly routing a requestor to an application.

FIG. 6 is a block diagram depicting an example resource request being routed to a specific resource. As shown in FIG. 6, at step (1), request 404 may be received at DACS 112 by first being processed by trust broker 114. As described above in FIG. 4, trust broker 114 may generate data structure 406 for request 404. At step (2) and in the example shown in FIG. 6, such data structure may contain at least a user identity section which has trust information. In this example embodiment, the trust information may indicate via user_roles that the requestor has the roles of HR-Admin and NYUsers. Moreover, the trust information via status may indicate that the requestor as an individual has a risk score of green. While not shown, this example may also indicate, via trust information from an EDM, that the requestor is making the resource request from a desktop computer located on the premises of the client.

At step (3), the data structure 406 may be passed to policy engine 116 in order to analyze data structure 406 against policies the client configured or coded, such as shown in FIG. 3. As discussed above, a custom access policy may include one or more evaluations to be applied to trust information, and corresponding actions to be taken based on results of the evaluation(s) of trust information. In the illustrated example, the client may have written a policy to route the resource request directly to a resource named benefits system based on the trust information in data structure 406. For example, policy engine 116 may use the written policy to determine that when a requestor has a role of HR-Admin, a status of green, is making a request from a on-premises desktop computer, and the requestor asks to be granted access to the benefits system resource, that the requestor should be routed to that resource. Such combination of trust information may be decided by the client to be enough to give direct access to the benefits system resource without any additional security measures or routing.

FIG. 7 is a block diagram depicting an example resource request being transformed into a modified request based on application of an access policy to trust information associated with the request. In the illustrated example, a request associated with a first role is converted to a modified request associated with a second role.

As shown in FIG. 7, at step (1), request 404 may be received at DACS 112 by first being processed by trust broker 114. As described above in FIG. 4, trust broker 114 may generate data structure 406 for request 404. At step (2) and in the example shown in FIG. 7, such data structure may contain at least a user identity section and a device identification and behavior section which both have trust information. In this example embodiment, the trust information may indicate via user_roles that the requestor has the roles of Contractor and NYUsers. Moreover, the trust information via status may indicate that the requestor as an individual has a risk score of yellow. This example may also indicate that via the device identification and behavior section that the requestor is making the recourse request from a mobile computing device.

At step (3), the data structure 406 may be passed to policy engine 116 in order to analyze data structure 406 against policies the client configured or coded, such as shown in FIG. 3. As discussed above, a custom access policy may include one or more evaluations to be applied to trust information, and corresponding actions to be taken based on results of the evaluation(s) of trust information. In the illustrated example, the client may have written a policy to require any requestor who is a contractor, has a status of below green, and is using a mobile computing device, to be mapped to a multifactor authentication (MFA) role within a certain resource because the client needs extra assurance that the requestor, who is a contractor and is higher risk, is taking precautions to not cause vulnerabilities in at least the client's computer network and systems. For example, policy engine 116 may use the written policy to determine that when a requestor has a role of Contractor, a status of yellow, and is making a request from a mobile computing device, that the requestor should be required to do MFA authentication regardless of the resource requested. Such combination of trust information may be decided by the client to require extra precautions should be taken because the requestor is not an employee of the client, has a status of below green, and is making a request on a mobile computing device.

While FIGS. 5-7 are meant to provide examples of access and routing policies, they are not meant to be limiting examples. As stated above, in some embodiments clients are given freedom to configure or code policies via the policy engine 116 as they see fit for their organization. For example, clients may write policies using policy engine 116 to analyze trust information and send a request and trust information to a web application firewall (WAF) such that the WAF can evaluate the trust information and resource request. The client may also update WAF rules to consider result of an analysis performed on the resource request and trust information.

Additionally, a level of access of a resource may be controlled via a custom written policy. For example, a written policy may be configured or coded by a client via policy engine 116 to allow only HR administrators into a payroll resource when either trust information or other information indicate that a client is currently under a distributed denial of service (DDOS). In the same vein, policies may be written to provide read only access and read/write access to a resource based mainly on the role of the requestor. For example, a role of auditor may only gain read access into an accounting resource whereas a role of chief financial officer (CFO) may be granted both read and write access to the accounting resource.

Example Routines

Figure 8:
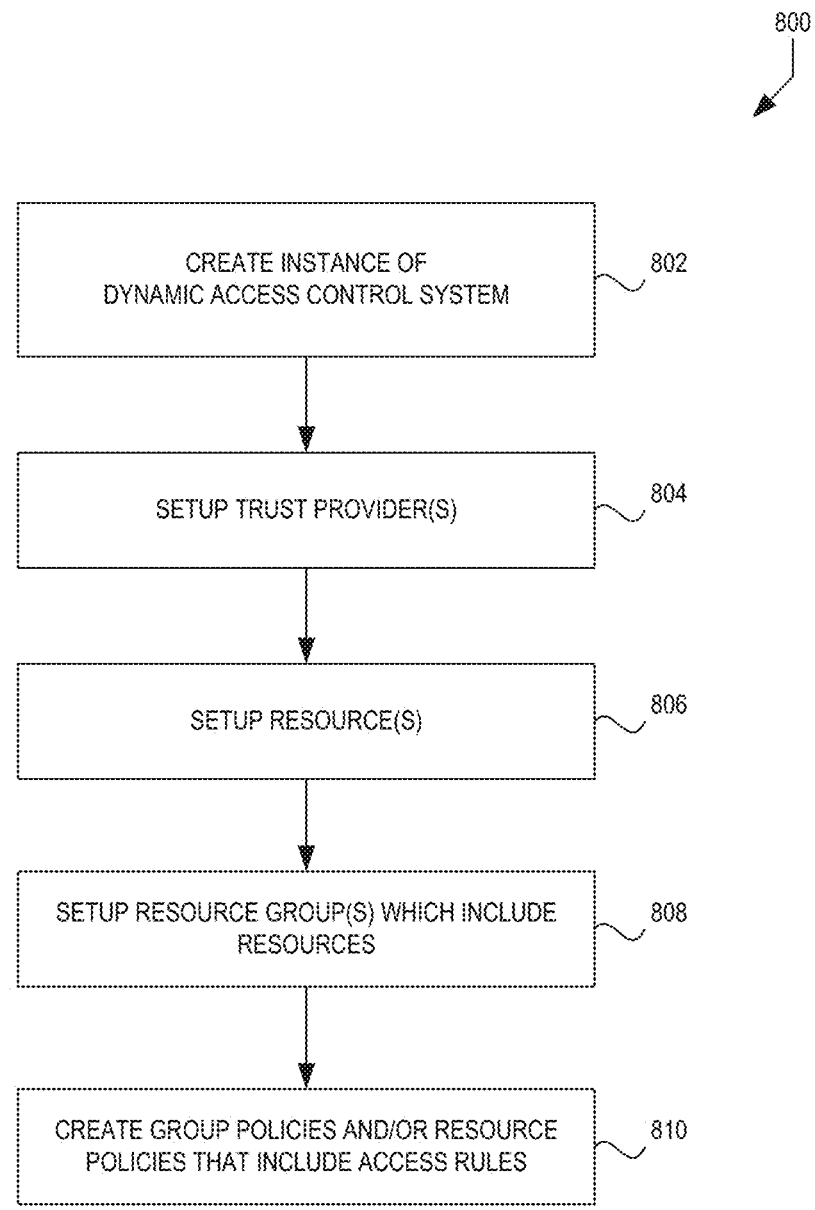
FIG. 8 is a flow diagram of an illustrative routine that may be executed to create an instance of a dynamic access control system and to setup the dynamic access control system.
Figure 9:
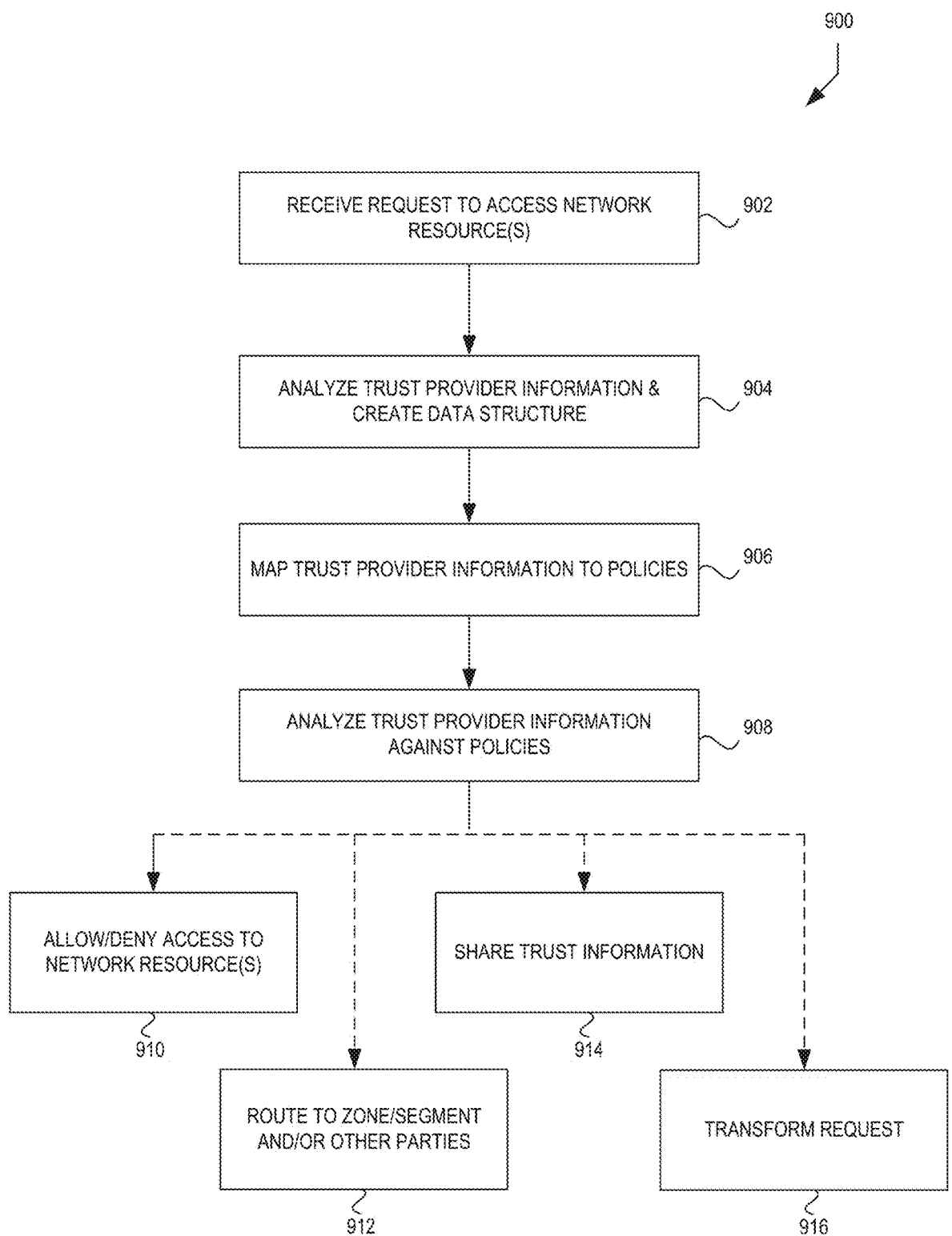
FIG. 9 is a flow diagram of an illustrative routine that may be executed to have a dynamic access control system evaluate and decide on a resource request.

FIGS. 8 and 9 are example non-limiting routines related to the configuration and operation of DACS 112. FIG. 8 is a flow diagram of an illustrative routine 800 that may be executed to create an instance of a dynamic access control system and to setup the dynamic access control system.

At block 802, a client of DACS 112 may create an instance of a dynamic access control system. In creating an instance, the client may choose to attach the instance directly to a network partition thereof (e.g., a VPC or segment) where resources can be deployed. For example, the client may not need to route resource requests to a network segment before a requestor is allowed access to a resource, and therefore the DACS 112 may be attached to a VPC. Alternatively, the client may attach the instance to a network gateway so that resource requests can be routed to different VPCs and on-premise networks accessible via the gateway. As a further example, the instance may be attached to an ingress point of a private network or a VPC-WAN, enabling policies to be written against resources deployed across multiple regions and on-premises networks. Ingress point attachment enables policies to be written for resources that are on different network segments, where traffic from one network segment is isolated from others. By attaching the instance to an ingress point, additional protection may be provided by keeping traffic for a resource to its own segment.

At block 804, the client may define trust providers via configuration or coding to be used by trust broker 114. As described above, trust providers may be directly connected, web extension enabled, or even out of band. DACS 112 allows not only a selection of trust providers but control of the exact trust information from those trust providers.

At block 806, the client may define resources via configuration or coding to be used by policy engine 116. As described above, resources may be mapped directly to resource requests when trust information associated with the resource requests satisfy policy requirements written by clients.

At block 808, the client may define resource groups to group together individual resources. This allows the client to give access broadly to resources that are logically grouped together, such as a grouping all legal resources under a resource group of legal.

Although FIG. 8 shows the definition of resources occurring prior to the definition of resource groups, the ordering is presented for purposes of illustration only and is not meant to be limiting or required. In some embodiments, resource groups may be defined prior to, or in parallel with, defining resources within resource groups.

At block 810, the client may configure or code written policies to effectively map trust information and requests to a specific resource or routing procedure. As stated above, the client has freedom to take the trust information from trust providers and choose to perform any action at least around resource access. For example, based on trust information provided, resource requests may be routed to a network segment. Or alternatively, routed directly to a resource. As another example, trust information and resource requests may be shared with other parties and systems such as WAFs.

FIG. 9 is a flow diagram of an illustrative routine 900 that may be executed to have a dynamic access control system evaluate and decide on a resource request. At block 902, DACS 112 may receive a request to access a resource. As stated above, a resource request may be received in a form of an HTTP request.

At block 904, DACS 112 may reference the coding or configuration setup that a client used to define trust providers. By referencing such coding or configuration, DACS 112 via trust broker 114 may determine what trust providers the client subscribed to and what trust information to access from the trust providers. After retrieving or otherwise accessing this trust provider information (e.g., from request headers, data stores, or directly from trust providers), trust broker 114 may create a custom data structure using the trust information. This data structure will be evaluated by the policy engine 116, specifically against client-defined access policies. As stated above, each data structure may be created in response to receiving a request for a resource. As such, each data structure created may be different in structure and content. Different in structure because the coding and configurations of the client may have changed because the client may have subscribed to different trust providers or even chose to receive more or less trust information from existing trust providers.

At block 906, DACS 112 may map the trust information and resource requests to custom access policies in the policy engine 116 when the trust information and requests trigger a custom access policy. At block 908, DACS 112 via policy engine 116 may evaluate the trust information and requests against the policies which match them in order to make routing or access decisions.

As a result of evaluating trust information based on an access policy, DACS 112 may determine one or more actions to be taken with respect to the request. For example, at block 910, depending on the written policy, policy engine 116 may directly allow access to a resource based on the trust information and request. As another example, at block 912, policy engine 116 may route the trust information and request to a network segment based on the contents of the trust information and request. As a further example, at block 914, via policy engine 116, the client may write a policy to share the trust information and request to other parties, such as a WAF, based on the contents of the trust information and request. Therefore, the trust information and request may be shared. As another example, at block 916, via policy engine 116, the client may write a policy to transform the request or aspects thereof (e.g., role, security context, destination IP address) based on the trust information.

Although FIG. 9 shows actions as being determined separately, the in some embodiments multiple actions may be determined and/or executed in parallel.

Example Dynamic Access Control System

Figure 10:
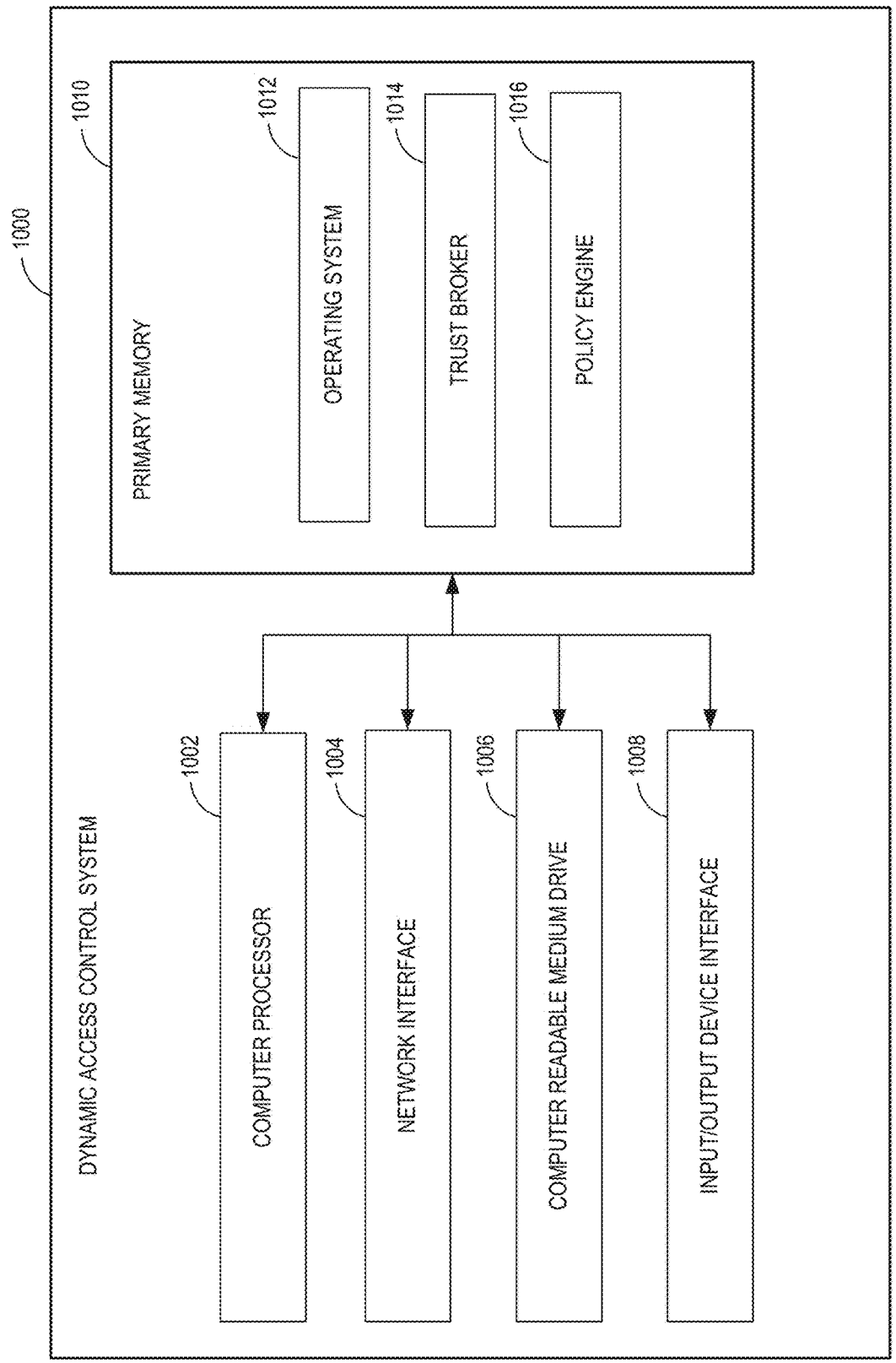
FIG. 10 is a block diagram of an illustrative dynamic access control system configured to implement features of some embodiments.

FIG. 10 illustrates various components of an example DACS configured to implement various functionality described herein.

In some embodiments, as shown, a DACS 1000 may include: one or more computer processors 1002, such as physical central processing units ("CPUs"); one or more network interfaces 1004, such as a network interface cards ("NICs"); one or more computer readable memory 1006; and one or more input and output device interfaces 1008.

The primary memory 1010 may include computer program instructions that one or more computer processors 1002 execute and/or data that the one or more computer processors 1002 use in order to implement one or more embodiments. For example, the primary memory 1010 can store an operating system 1012 to provide general administration of the DACS 112. As another example, the primary memory 1010 can store trust broker 1014 for storing coding and configuration for defining trust providers. As a further example, the primary memory 1010 can store policy engine 1016 which policy engine 106 can execute polices against data structures created by the trust broker.

TERMINOLOGY AND ADDITIONAL CONSIDERATIONS

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the scope of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
   computer-readable memory storing executable instructions; and
   at least one computing device in communication with the computer-readable memory and programmed by the executable instructions to:
      receive, from a device of a user, a request to access a network application;
      receive, associated with the request, trust information generated by one or more trust providers, wherein the trust information represents at least:
         first identity information regarding the user; and
         second identity information regarding the device;
      create a trust information data structure using the first identity information and the second identity information;
      access a network application policy, wherein the network application policy maps the trust information data structure to one or more of (i) an access level of the network application, (ii) an access level to a network segment of a cloud provider network, (iii) routing instructions to a network firewall, or (iv) routing instructions to a network router;
      transform the request based on the trust information data structure, wherein the transformation comprises a change to at least one of role, security context, and destination Internet protocol address;
      determine access or routing information based at least in part on the network application policy and the trust information; and
      perform an access or routing action based at least partly on the access or routing information.

2. The system of claim 1, wherein the trust information generated by the one or more trust providers is provided, via a hypertext transfer protocol request, by a browser extension executing on the device of the user.

3. The system of claim 1, wherein the access or routing information comprises at least one of:
   an access level of the network application;
   an access level to a network segment;
   routing instructions to a network firewall;
   routing instructions to a network router; or
   a denial of access to the network application.

4. The system of claim 1, wherein the access or routing action comprises at least one of:
   providing the user with a level of access to the network application;
   providing the user access to a network segment;
   routing the trust information to a network firewall;
   routing the trust information to a network router; or
   denying access to the network application.

5. A computer-implemented method comprising:
   under control of a computing system associated with a cloud provider network, the computing system comprising one or more computer processors configured to execute specific instructions:
      receiving a request directed to a network resource on the cloud provider network, the request comprising first trust information representing one or more properties of a source of the request;
      generating second trust information based at least partly on the first trust information and additional trust information obtained separately from the request, wherein the additional trust information is associated with the source of the request;
      transforming the request based on the second trust information to change at least one of role, security context, and destination Internet protocol address; and
      determining an action to be taken regarding the transformed request based on evaluation of the second trust information.

6. The computer-implemented method of claim 5, further comprising determining, from the first trust information, a property of the one or more properties of the source of the request, wherein the property comprises: an identity of a user account, a property of the user account, an identity of a device, or a property of the device.

7. The computer-implemented method of claim 5, further comprising accessing the additional trust information based at least partly on an association between the additional trust information and the source of the request, wherein the additional trust information comprises: a history of the source of the request, a security risk score associated with the source of the request, or a location of the source of the request.

8. The computer-implemented method of claim 5, further comprising receiving the additional trust information prior to receiving the request.

9. The computer-implemented method of claim 5, wherein generating the second trust information comprises generating a trust information data structure using a plurality of trust information items selected by a client associated with the network resource.

10. The computer-implemented method of claim 5, wherein transforming the request with the second trust information to generate the transformed request comprises adding the second trust information to one or more headers of the request.

11. The computer-implemented method of claim 5, wherein transforming the request with the second trust information to generate the transformed request comprises adding the second trust information to one or more encapsulation headers, wherein a packet of the request is encapsulated for transmission.

12. The computer-implemented method of claim 5, further comprising removing, from the request, a header comprising at least a portion of the first trust information.

13. The computer-implemented method of claim 5, wherein determining the action to be taken regarding the transformed request based on evaluation of the second trust information comprises determining to transmit the transformed request to the network resource based on the second trust information satisfying an access policy.

14. The computer-implemented method of claim 5, wherein determining the action to be taken regarding the transformed request based on evaluation of the second trust information comprises determining to transmit the transformed request to a firewall configured to apply an access policy to determine whether to transmit the transformed request to the network resource.

15. The computer-implemented method of claim 5, wherein determining the action to be taken regarding the transformed request based on evaluation of the second trust information comprises determining to transmit the transformed request over a segment of a plurality of segments of the cloud provider network, the segment selected based on the second trust information satisfying an access policy.

16. A system comprising:
  computer-readable memory storing executable instructions; and
  one or more processors in communication with the computer-readable memory and programmed by the executable instructions to:
    receive a request directed to a network resource on a network, the request comprising first trust information representing one or more properties of a source of the request;
    generate second trust information based at least partly on the first trust information and additional trust information obtained separately from the request, wherein the additional trust information is associated with the source of the request;
    transform the request based on the second trust information to change at least one of role, security context, and destination Internet protocol address; and
    determine an action to be taken regarding the transformed request based on evaluation of the second trust information.

17. The system of claim 16, wherein the one or more processors are further programmed by the executable instructions to determine, from the first trust information, a property of the one or more properties of the source of the request, wherein the property comprises: an identity of a user account, a property of the user account, an identity of a device, or a property of the device.

18. The system of claim 16, wherein the one or more processors are further programmed by the executable instructions to access the additional trust information based at least partly on an association between the additional trust information and the source of the request, wherein the additional trust information comprises: a history of the source of the request, a security risk score associated with the source of the request, or a location of the source of the request.

19. The system of claim 16, wherein to transform the request with the second trust information to generate the transformed request, the one or more processors are further configured to add the second trust information to one of: a header of the request, or an encapsulation header.

20. The system of claim 16, wherein the action to be taken comprises one of: transmitting the transformed request to the network resource based on the second trust information satisfying an access policy, transmitting the transformed request to a firewall configured to apply an access policy to determine whether to transmit the transformed request to the network resource, or transmitting the transformed request over a segment of a plurality of segments of the network, the segment selected based on the second trust information satisfying an access policy.

\* \* \* \* \*